(12) United States Patent
Grace et al.

(10) Patent No.: US 12,331,557 B2
(45) Date of Patent: Jun. 17, 2025

(54) PUSH-PUSH LATCHING MECHANISM INCLUDING AN IMPACT LOAD LOCK OUT FEATURE FOR A VEHICLE ACCESS PANEL

(71) Applicant: GM Global Technology Operations LLC, Detroit, MI (US)

(72) Inventors: Scott P. Grace, Beverly Hills, MI (US); Ronald G. Lahti, Rochester Hills, MI (US); Rohit Praveenkumar Patil, Farmington, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 252 days.

(21) Appl. No.: 18/178,864

(22) Filed: Mar. 6, 2023

(65) Prior Publication Data
US 2024/0301725 A1    Sep. 12, 2024

(51) Int. Cl.
| | |
|---|---|
| *E05B 77/12* | (2014.01) |
| *E05B 83/30* | (2014.01) |
| *E05C 19/02* | (2006.01) |
| *B60R 7/06* | (2006.01) |

(52) U.S. Cl.
CPC .............. *E05B 77/12* (2013.01); *E05B 83/30* (2013.01); *E05C 19/022* (2013.01); *B60R 7/06* (2013.01)

(58) Field of Classification Search
CPC .......... E05B 77/02; E05B 77/04; E05B 77/06; E05B 77/12; E05B 83/30; E05B 63/22; E05C 19/02; E05C 19/022; Y10S 292/04; Y10S 292/22; B60R 7/00; B60R 7/04; B60R 7/046; B60R 7/06
USPC ..................... 296/37.1, 37.8, 37.12
See application file for complete search history.

(56) References Cited

U.S. PATENT DOCUMENTS

2006/0061110 A1 *  3/2006  Haba ....................... E05B 77/02
                                                                     292/300

FOREIGN PATENT DOCUMENTS

| DE | 102018107239 A1 * | 10/2019 | ............. E05B 83/28 |
| GB | 2394251 A * | 4/2004 | ........... E05C 19/022 |

* cited by examiner

*Primary Examiner* — Gilbert Y Lee
*Assistant Examiner* — Peter H Watson
(74) *Attorney, Agent, or Firm* — CANTOR COLBURN LLP

(57) ABSTRACT

A storage compartment for a vehicle includes a first surface fixedly mounted relative to the vehicle, a second surface moveably mounted relative to the first surface, and a latching mechanism including a first latch element mounted to one of the first surface and the second surface and a second latch element mounted to another of the first surface and the second surface. The second latch element includes a first passage, a second passage, and an impact load lockout feature including a latch element rest arranged between the first passage and the second passage. The latch element rest includes an opening and a latch element trap. The opening is formed to allow passage of the first latch element into the latch element trap when the second surface is exposed to an impact load exceeding a design force.

20 Claims, 7 Drawing Sheets

PUSH-PUSH LATCHING MECHANISM INCLUDING AN IMPACT LOAD LOCK OUT FEATURE FOR A VEHICLE ACCESS PANEL

INTRODUCTION

The subject disclosure relates to the art of vehicles and, more particularly, to a push-push latching mechanism including an impact load lock out feature for a vehicle storage compartment.

Vehicles include a number of storage compartments. Storage compartments are provided to store miscellaneous items, to serve as cup holders, sunglasses holders, and the like. Many of those storage compartments include a push-push latching mechanism. To open the storage compartment, a push force is applied to unseat a pin from a rest. The pin travels along a first path to an opening, allowing the compartment to swing open freely. To close the storage compartment, a second push force is applied. The second push force guides the pin along a second path back to the rest. When the second push force is removed, the storage compartment will be held closed. The simplicity of design, robust nature of the latching mechanism, and ease of use make such storage compartments desirable by consumers.

While such storage compartments are ubiquitous in vehicle passenger areas, their use is limited to specific locations. That is, there is a Federal Motor Vehicle Safety Standard (FMVSS201) that requires storage compartments to remain closed when subjected to sudden and unintentional impact forces such as might occur during a collision. As the push-push latching mechanism would open under such a force, storage compartments including such a latching mechanism are typically not located in areas where an impact may occur. Limiting use locations for compartments having a push-push latching mechanism places constraints on passenger compartment designs. Accordingly, it is desirable to provide a push-push latching mechanism with a holding element that would prevent inadvertent opening when exposed to sudden and unintentional impact forces.

SUMMARY

A storage compartment for a vehicle, in accordance with a non-limiting example, includes a first surface fixedly mounted relative to the vehicle, a second surface moveably mounted relative to the first surface, and a latching mechanism including a first latch element mounted to one of the first surface and the second surface and a second latch element mounted to another of the first surface and the second surface. The second latch element includes a first passage, a second passage, and an impact load lockout feature including a latch element rest arranged between the first passage and the second passage. The latch element rest includes an opening and a latch element trap. The opening is formed to allow passage of the first latch element into the latch element trap when the second surface is exposed to an impact load exceeding a design force.

In addition to one or more of the features described herein the impact load lock-out feature includes a first wall forming a surface of the first passage, a second wall defining a surface portion of the second passage, and a recess forming the latch element rest defined between the first wall and the second wall.

In addition to one or more of the features described herein the first wall incudes a first end portion and the second wall includes a second end portion, a first angled surface being arranged at the first end portion and a second angled surface being arranged at the second end portion, the first angled surface and the second angled surface defining the latch element rest.

In addition to one or more of the features described herein the opening is defined between the first angled surface and the second angled surface.

In addition to one or more of the features described herein the first angled surface is spaced from the first end portion, and the second angled surface is formed in the second end portion.

In addition to one or more of the features described herein a guide element connects the first wall and the second wall, the guide element separating the first passage and the second passage.

In addition to one or more of the features described herein a first throat member extends from the first wall spaced from the first angled surface and a second throat member extending from the second wall opposite the first throat member, the first throat member and the second throat member defining a second latch element rest.

In addition to one or more of the features described herein the latch element trap is defined between the first latch element rest and the second latch element rest.

In addition to one or more of the features described herein another latch element trap is defined between the second latch element rest and the guide element.

In addition to one or more of the features described herein the first latch element comprises a pin mounted to one of the first surface and the second surface.

A vehicle, in accordance with a non-limiting example, includes a body defining a passenger compartment and a storage compartment arranged in the passenger compartment. The storage compartment includes a first surface fixedly mounted relative to the body, a second surface pivotally connected to the storage compartment relative to the first surface, and a latching mechanism including a first latch element mounted to one of the first surface and the second surface and a second latch element mounted to another of the first surface and the second surface. The second latch element includes a first passage, a second passage, and an impact load lockout feature including a latch element rest arranged between the first passage and the second passage. The latch element rest includes an opening and a latch element trap. The opening is formed to allow passage of the first latch element into the latch element trap when the second surface is expose to an impact load exceeding a design pressure.

In addition to one or more of the features described herein the impact load lock-out feature includes a first wall forming a surface of the first passage, a second wall defining a surface portion of the second passage, and a recess forming the latch element rest defined between the first wall and the second wall.

In addition to one or more of the features described herein the first wall incudes a first end portion and the second wall includes a second end portion, a first angled surface being arranged at the first end portion and a second angled surface being arranged at the second end portion, the first angled surface and the second angled surface defining the latch element rest.

In addition to one or more of the features described herein the opening is defined between the first angled surface and the second angled surface.

In addition to one or more of the features described herein the first angled surface is spaced from the first end portion, and the second angled surface is formed in the second end portion.

In addition to one or more of the features described herein a guide element connects the first wall and the second wall, the guide element separating the first passage and the second passage.

In addition to one or more of the features described herein a first throat member extends from the first wall spaced from the first angled surface and a second throat member extending from the second wall opposite the first throat member, the first throat member and the second throat member defining a second latch element rest.

In addition to one or more of the features described herein the latch element trap is defined between the first latch element rest and the second latch element rest.

In addition to one or more of the features described herein another latch element trap is defined between the second latch element rest and the guide element.

In addition to one or more of the features described herein the first latch element comprises a pin mounted to the one of the first surface and the second surface.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
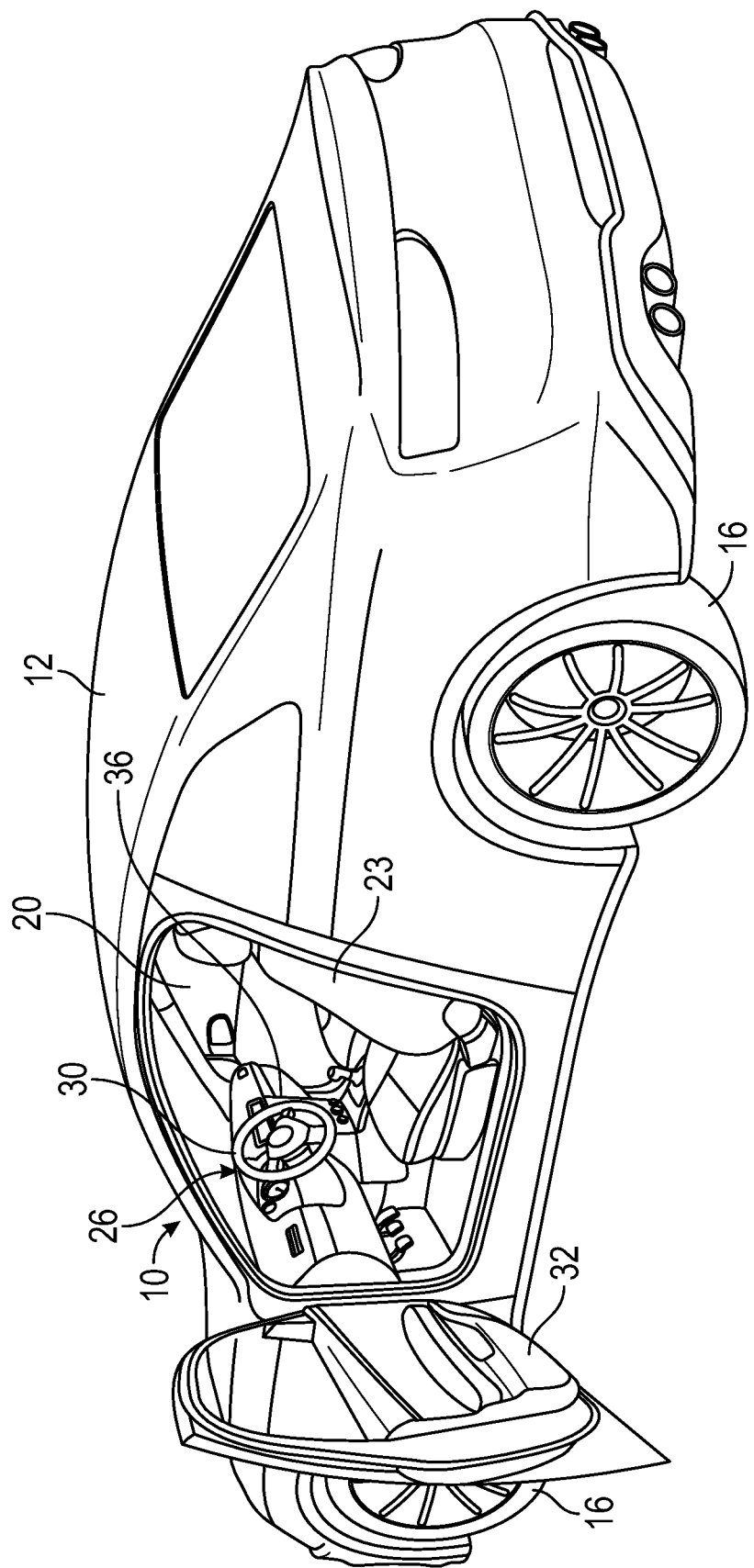
FIG. 1 is a left side view of a vehicle including a storage compartment having a push-push latching mechanism having an impact load lock out feature, in accordance with a non-limiting example.

The following description is merely exemplary in nature and is not intended to limit the present disclosure, its application or uses. It should be understood that throughout the drawings, corresponding reference numerals indicate like or corresponding parts and features.

A vehicle, in accordance with a non-limiting example, is indicated generally at 10 in FIG. 1. Vehicle 10 includes a body 12 supported on a plurality of wheels 16. At least two of the plurality of wheels 16 are steerable. Body 12 defines, in part, a passenger compartment 20 having seats, one of which is indicated at 23. Seat 23 is positioned behind a dashboard 26. A steering control system 30 is arranged between seat 23 and dashboard 26. Passenger compartment 20 is accessed via a door 32 which, in the non-limiting example shown, is in an open position.

Figure 2:
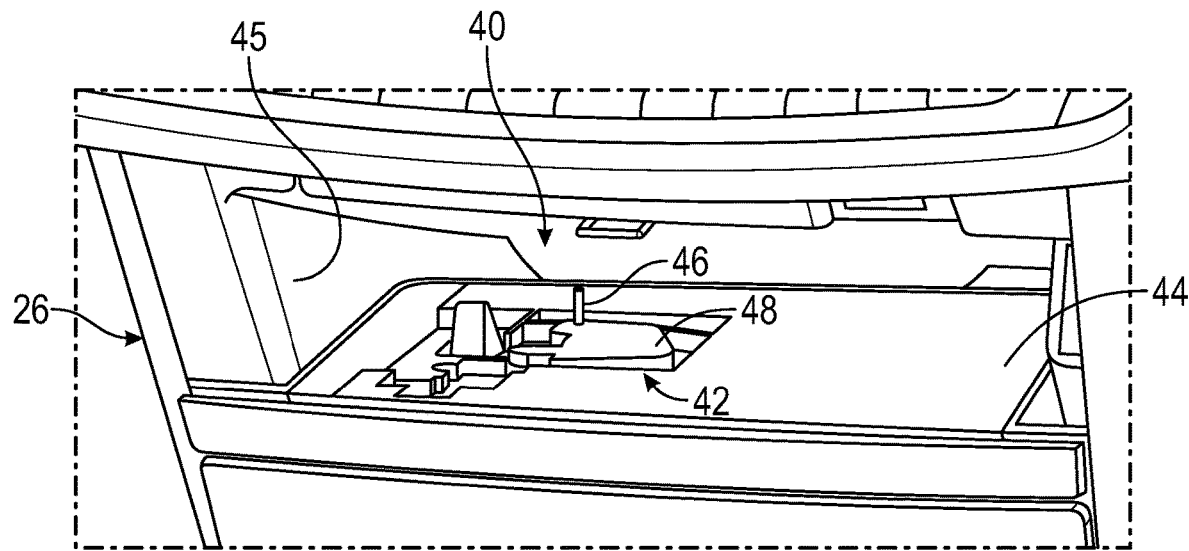
FIG. 2 is a perspective view of a storage compartment receiving recess including a first latch element of the push-push latching mechanism, in accordance with a non-limiting example.
Figure 3:
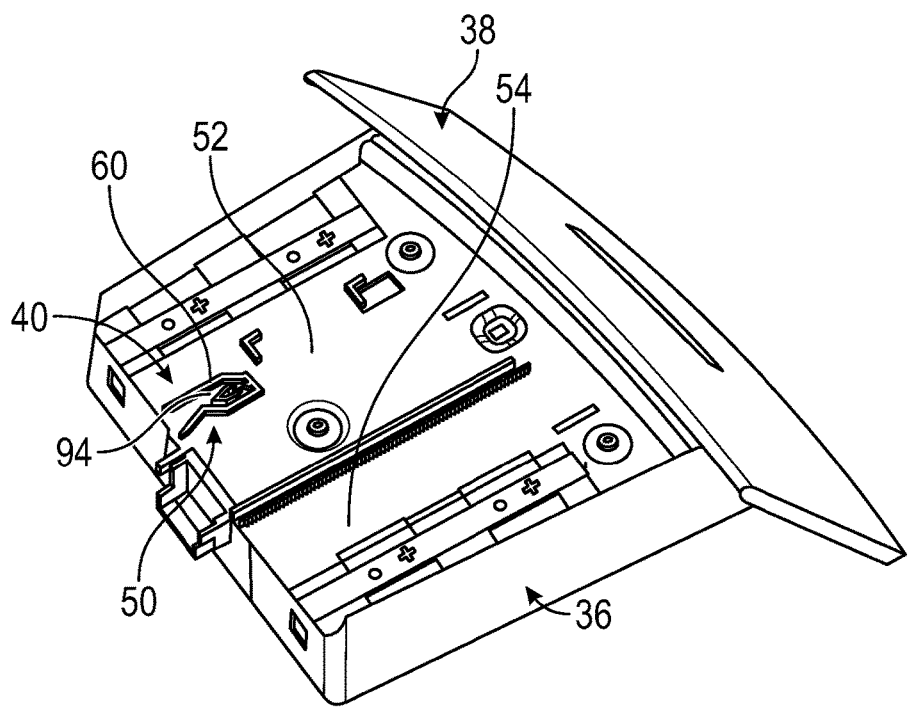
FIG. 3 is a perspective view of a bottom surface of a storage compartment including a second latch element of the push-push latching mechanism, in accordance with a non-limiting example.

Referring to FIGS. 2 and 3, dashboard 26, in accordance with a non-limiting example, includes a storage compartment or bin 36 having a cover 38. Storage compartment 36 is provided with a push-push latching mechanism 40 (FIGS. 2 and 3). In a non-limiting example, push-push latching mechanism 40 includes a first latch element 42 (FIG. 2) mounted to first surface 44 of a bin receiving opening or recess 45 formed in dashboard 26. First surface 44 is a stationary surface that may form part of dashboard 26. First latch element 42 is shown in the form of a pin 46 having a circular cross-section projecting from first surface 44. First latch element 46 may include a slider 48 that can transition or shift relative to first surface 44 as will be discussed more fully herein. Push-push latching mechanism 40 further includes a second latch element 50 (FIG. 3) mounted to bin 36. In the non-limiting example shown, second latch element 50 is mounted to a second surface 52 that forms an underside 54 of bin 36.

Figure 4A:
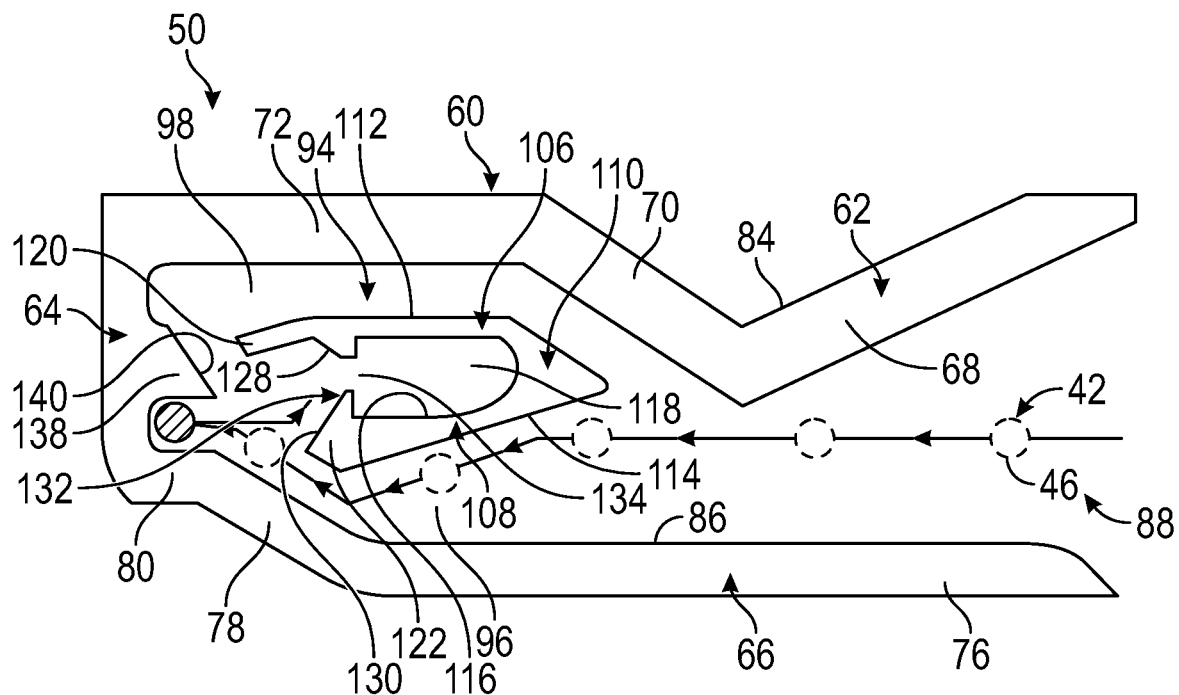
FIG. 4A is a schematic view of the second latch element of the push-push latching mechanism receiving the first latch element, in accordance with a non-limiting example.

Reference will now follow to FIG. 4A, with continued reference to FIGS. 2 and 3 in describing second latch element 50. In a non-limiting example, second latch element 50 includes a wall 60 including a first portion 62, a second portion 64, and a third portion 66. First portion 62 includes a first segment 68 extending at a first angle, a second segment 70 that extends at a second angle that is in an opposite direction to the first angle, and a third segment 72 that extends at a third angle that is distinct from the first angle and the second angle. Third portion 66 includes a first section 76 that extends at the third angle, a second section 78 having an angle substantially similar to the second angle of second segment 70, and a third section 80 that extends at the third angle.

Wall 60 includes an outer surface 84 and an inner surface 86. A pin receiving opening 88 is defined between first segment 68 and first section 76. As will be detailed more fully herein, first latch element 42 passes through pin receiving opening 88 as bin 36 transitions between an open configuration and a closed configuration.

In a non-limiting example, second latch element 50 includes an impact load lock-out feature 94 that captures first latch element 42 if a sudden impact load, exceeding a selected force threshold, is perceived by bin 36. Capturing first latch element 42 prevents bin 36 from opening and allowing contents contained therein to move about passenger compartment 20 in an uncontrolled manner. Lock-out feature 94 defines a first passage 96 and a second passage 98 within wall 60. In a non-limiting example, lock-out feature 94 includes a first wall 106, a second wall 108, and a guide element 110. First wall 106 defines a first outer surface portion 112 of lock-out feature 94 and second wall 108 defines a second outer surface portion 114 of lock-out feature 94. First wall 106, second wall 108 and guide element 110 also define an inner surface portion 116 that forms a latch element trap 118.

As will be detailed more fully herein, guide element 110 directs first latch element 42 into first passage 96 and out from second passage 98. Slider 48 provides a range of motion for first latch element 42 that facilitates the travel into and the travel out from second latch element 50. In the non-limiting example shown, second passage 98 is defined between first outer surface portion 112 of first wall 106 and first portion 62 of wall 60. First passage 96 is defined between second outer surface portion 114 of second wall 108 and third portion 66 of wall 60. In a non-limiting example, first wall 106 includes a first end portion 120 that is spaced from second portion 64 of wall 60 and second wall 108 includes a second end portion 122 that is spaced from second portion 64 of wall 60 and from first end portion 120 of first wall 106.

Figure 4B:
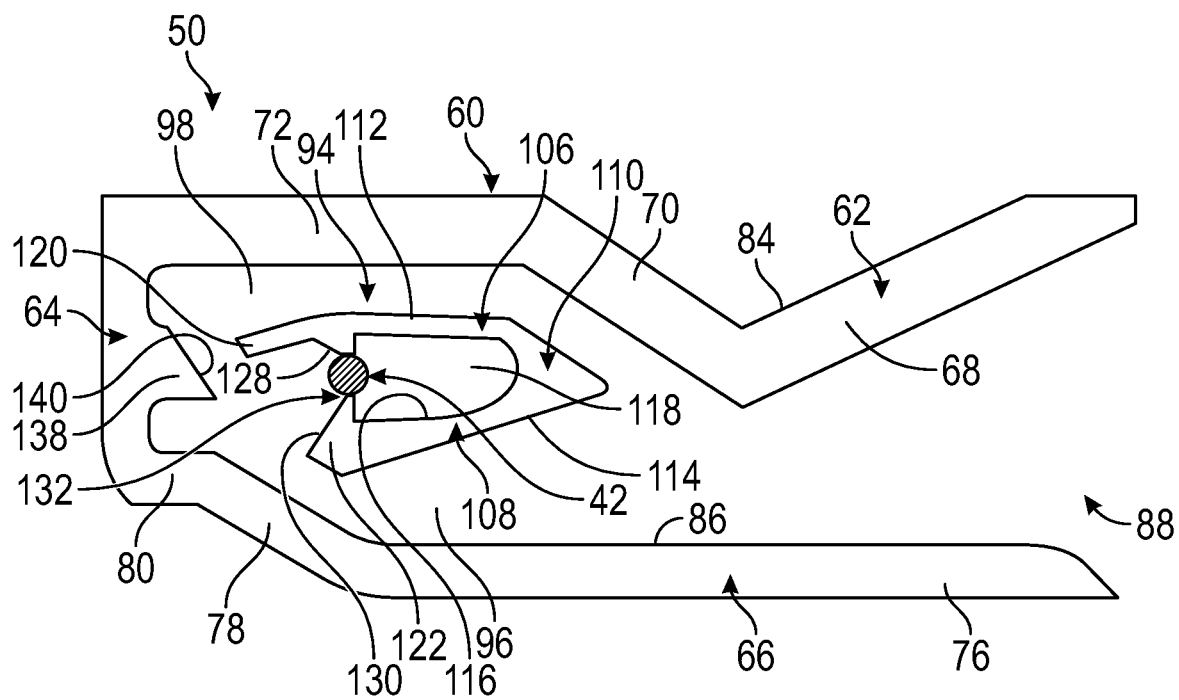
FIG. 4B is a schematic view of the second latch element of the push-push latching mechanism showing the first latch element on a latch element rest, in accordance with a non-limiting example.

In a non-limiting example, a first angled surface 128 is arranged adjacent to first end portion 120 and a second angled surface 130 is arrange adjacent to second end portion 122. In one non-limiting example, first angled surface 128 is spaced from first end portion 120 while second angled surface 130 forms part of second end portion 122. First angled surface 128 and second angled surface 130 form a latch element rest 132 having an opening 134 leading into latch element trap 118. Opening 134 is sized to prevent first latch element 42 from passing into latch element trap 118 under normal conditions such as shown in FIG. 4B and allow first latch element 42 to pass into latch element trap 118 as shown in FIG. 4D when a predetermined impact load force is applied to bin 36. The amount of the predetermined impact load force may vary depending on vehicle model, the location in passenger compartment 20 of storage compartment 36, the size of storage compartment 38 as well as other factors.

In a non-limiting example, from an open position, bin 36 is pushed toward a closed position such that first latch element 42 shifts with slider 48 relative to first surface 44 and travels along first passage 96 toward second portion 64 of wall 60 as shown in FIG. 4A. A projection 138 having an angled surface portion 140 projects toward lock-out feature 94. Projection 138 guides first latch element 42 onto latch element rest 132 as shown in FIG. 4B. At this point, bin 36 is in a closed configuration.

Figure 4C:
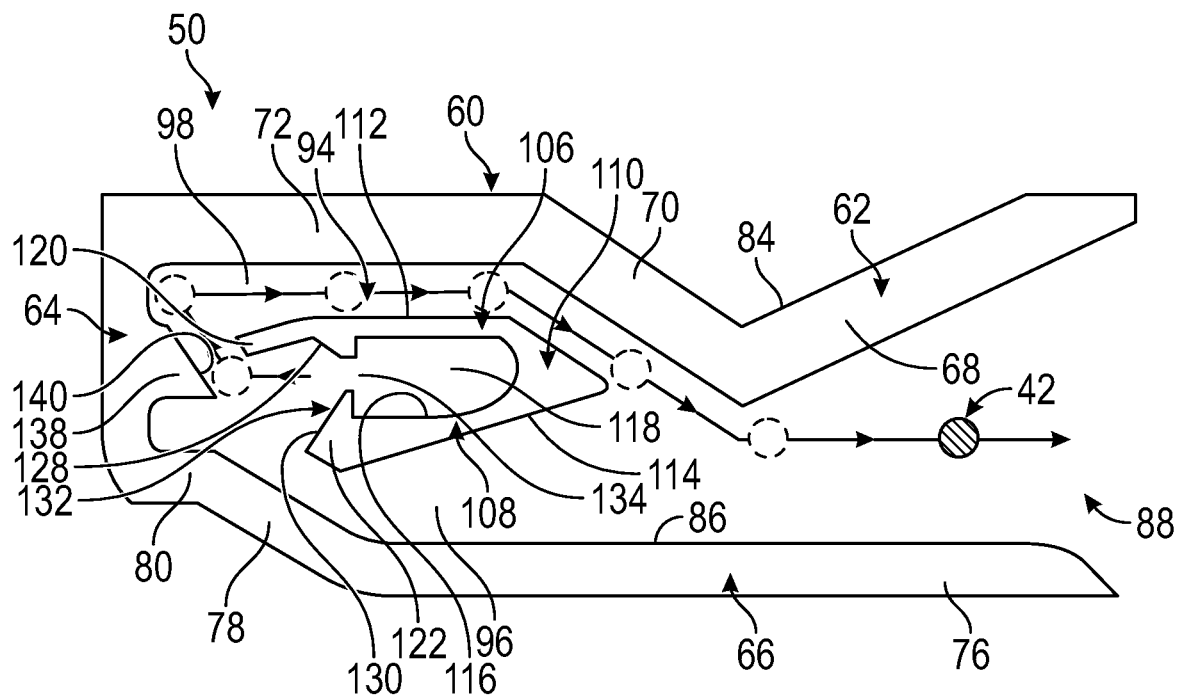
FIG. 4C is a schematic view of the second latch element of the push-push latching mechanism releasing the first latch element, in accordance with a non-limiting example.
Figure 4D:
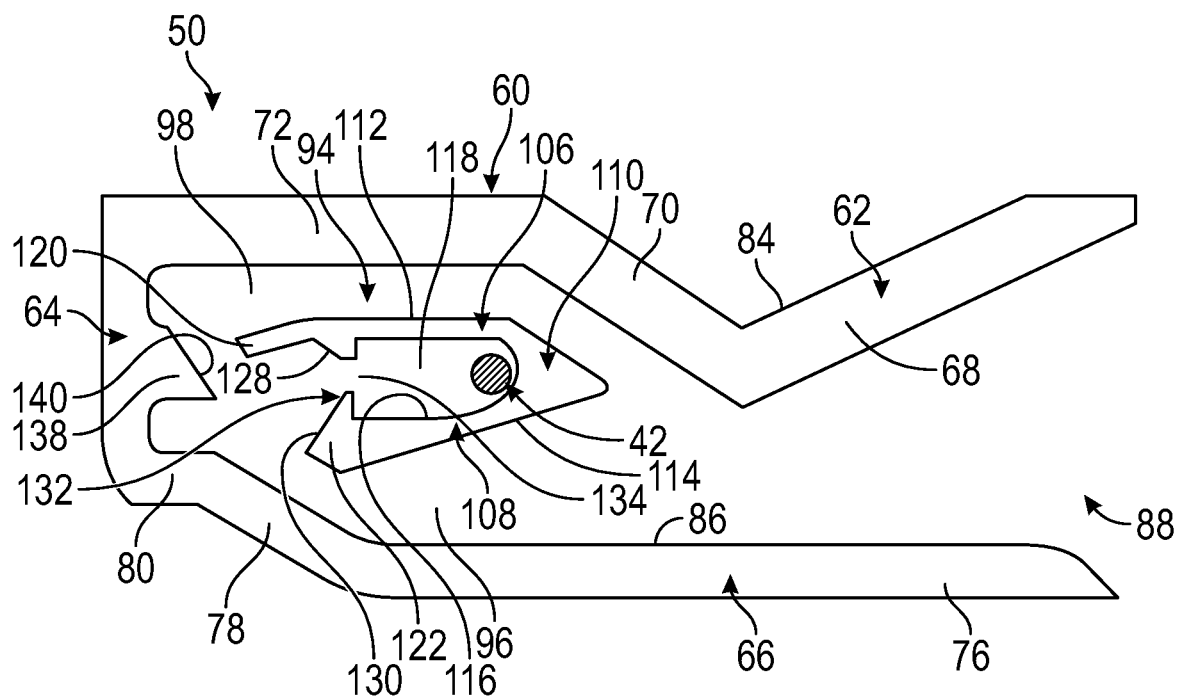
FIG. 4D is a schematic view of the second latch element of the push-push latching mechanism trapping the first latch element after an impact load, in accordance with a non-limiting example.

From the closed configuration, bin 36 is again pushed causing first latch element 42 to unseat from latch element rest 132 and pass along angled surface portion 140 and into second passage 98 as shown in FIG. 4C allowing bin 36 to open. At this point, it should be understood, that the push and the push overcomes a biasing force provided by a spring (not shown) that holds first latch element 42 against latch element rest 132. At this point it should be understood that bin 36 may transition from a closed configuration to an open configuration, and back to the closed configuration based on the application of multiple pushes (hence the push-push designation).

In accordance with a non-limiting example, bin 36 should remain closed if subjected to a sudden impact load that exceeds a selected force threshold. As such, if bin 36 is subjected to such an impact load, first latch element 42 is forced or driven through opening 134 into latch element trap 118 as shown in FIG. 4D. Upon first latch element 42 entering into latch element trap 118, bin 36 is held in a closed position such that any contents in storage compartment 36 are retained and cannot fly about passenger compartment 20. Bin 36 may be reopened by applying a quick pull force that forces first latch element 42 back through opening 134 to latch element rest 132.

Figure 5:
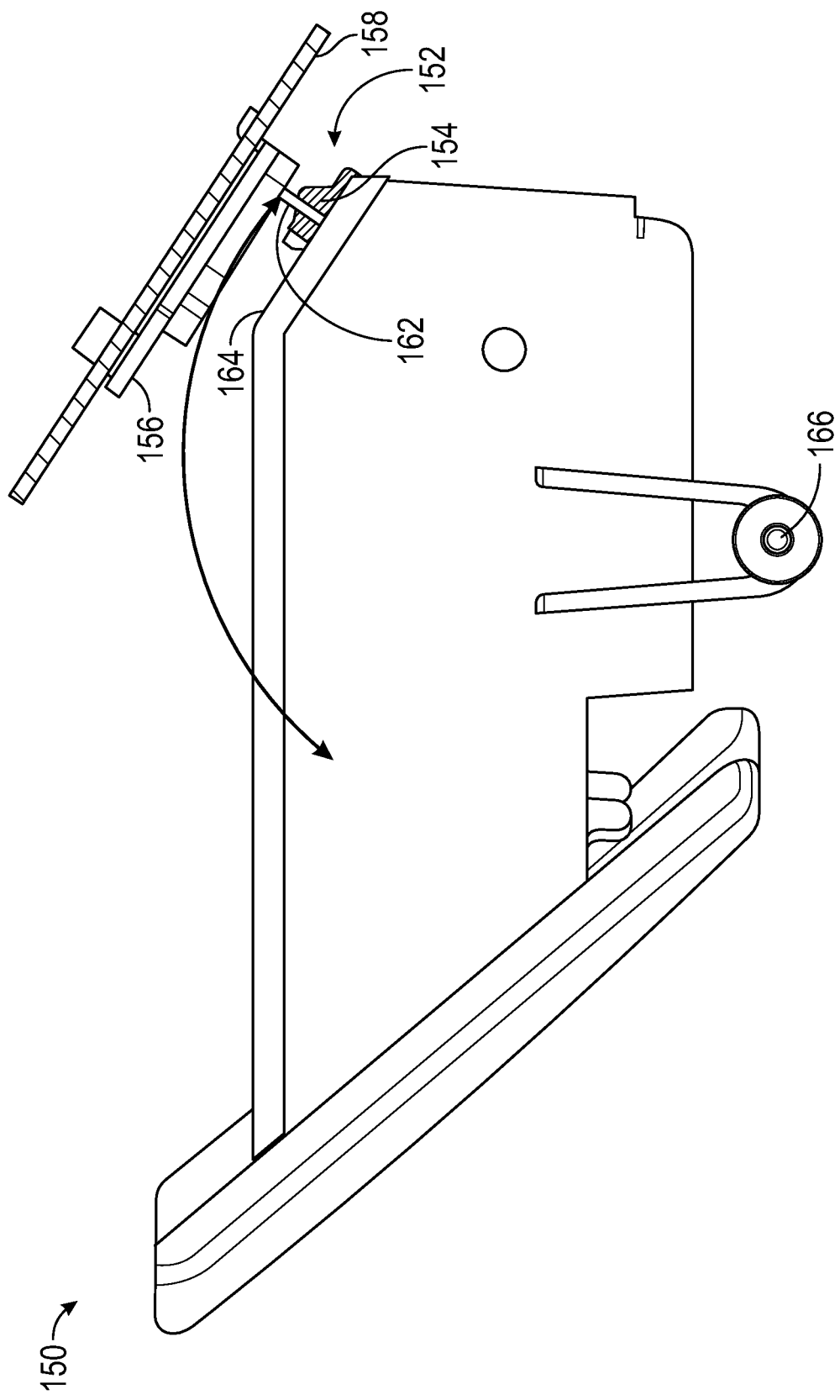
FIG. 5 is a side view of a storage compartment including a push-push latching mechanism including a first latch element and a second latch element having an impact load lock out feature, in accordance with a non-limiting example.

Reference will now follow to FIG. 5 in describing a bin 150 including a push-push latching mechanism 152 in accordance with another non-limiting example. Push-push latching mechanism 152 includes a first latch element 154 and a second latch element 156. Second latch element 156 is mounted to a first surface 158 that is fixed to dashboard 26. In a non-limiting example, first latch element 154 takes the form of a pin 162 that is mounted to a second surface 164 that forms part of bin 150. Thus, as bin 150 pivots about a hinge 166 and transitions between open and closed configurations, first latch element 154 transitions through second latch element 156 in a manner similar to that discussed herein.

Figure 6A:
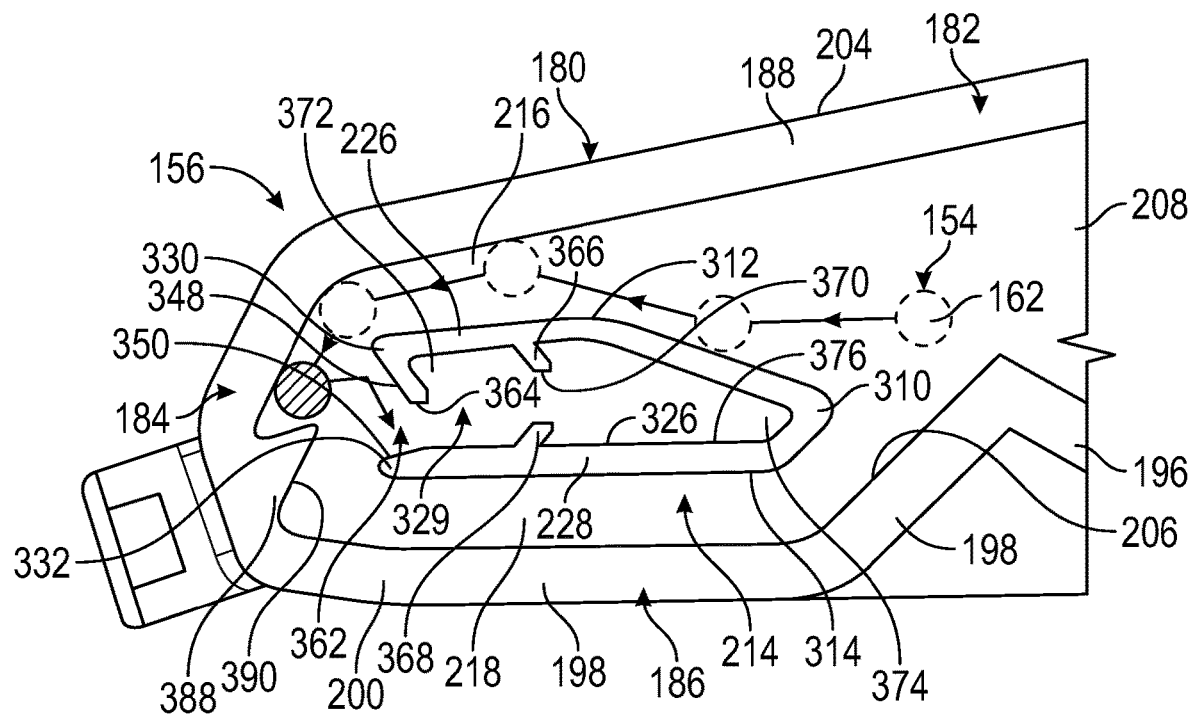
FIG. 6A is a schematic view of the second latch element of the push-push latching mechanism of FIG. 5 receiving the first latch element, in accordance with a non-limiting example.

Referring to FIG. 6A, and with continued reference to FIG. 5, second latch element 156 is fixedly mounted to first surface 158 and includes a wall 180 including a first portion 182, a second portion 184, and a third portion 186. First portion 182 includes a first segment 188 extending at a first angle. Third portion 186 includes a first section 196, a second section 198, and a third section 200. Wall 180 has an outer surface 204 and an inner surface 206. A pin receiving opening 208 is defined between first segment 188 of first portion 182 and first section 196 of third portion 186. As will be detailed more fully herein, first latch element 154 passes through pin receiving opening 208 as bin 150 transitions between an open configuration and a closed configuration.

In a non-limiting example, second latch element 156 includes an impact load lock-out feature 214 that captures first latch element 154 if a sudden impact load, exceeding a selected force impact load threshold, is perceived by bin 150. Capturing first latch element 154 prevents bin 150 from opening and allowing contents contained therein to move about passenger compartment 20 in an uncontrolled manner. Lock-out feature 214 defines a first passage 216 and a second passage 218 within wall 180. In a non-limiting example, lock-out feature 214 includes a first wall 226, a second wall 228, and a guide element 310. First wall 226 defines a first outer surface portion 312 of lock-out feature 214 and second wall 228 defines a second outer surface portion 314 of lock-out feature 214. First wall 226, second wall 228 and guide element 310 also define an inner surface portion 326 that forms a latch element trap 329.

As will be detailed more fully herein, guide element 310 directs first locking element 154 into first passage 216 and out from second passage 218. Thus, first passage 216 is defined between first outer surface portion 312 of first wall 226 and first portion 182 of wall 180. Second passage 218 is defined between second outer surface portion 314 of second wall 228 and third portion 186 of wall 180. In a non-limiting example, first wall 226 includes a first end portion 330 that is spaced from second portion 184 of wall 180 and second wall 228 includes a second end portion 332 that is spaced from second portion 184 of wall 180 and from first end portion 330 of first wall 228.

In a non-limiting example, a first angled surface 348 is arranged adjacent to first end portion 330 and a second angled surface 350 is arrange adjacent to second end portion 332. In one non-limiting example, first angled surface 348 is extends inwardly relative to first end portion 330 while second angled surface 350 forms part of second end portion 332. First angled surface 348 and second angled surface 350 form a latch element rest 362 having a first opening 364 leading into latch element trap 329.

In a non-limiting example, lock-out feature 214 further includes a first throat member 366 extending from first wall 226 into latch element trap 329 and a second throat member 368 extending from second wall 228 into latch element trap 329. First throat member 366 is spaced from second throat member 368 by a second opening 370. First throat member 366 and second throat member 368 separate latch element trap 329 into a first trap portion 372 and a second trap portion 374. First opening 364 and second opening 370 are sized to allow first latch element 154 to pass into first trap portion 372 of latch element trap 329 when a predetermined impact load force is applied to bin 150. The amount of the predetermined impact load force may vary depending on vehicle model, the location in passenger compartment 20 of storage compartment 36, the size of bin 150 as well as other factors. The amount of impact load force applied will also dictate whether first latch element 154 also passes through second opening 370 into second trap portion 374.

Figure 6B:
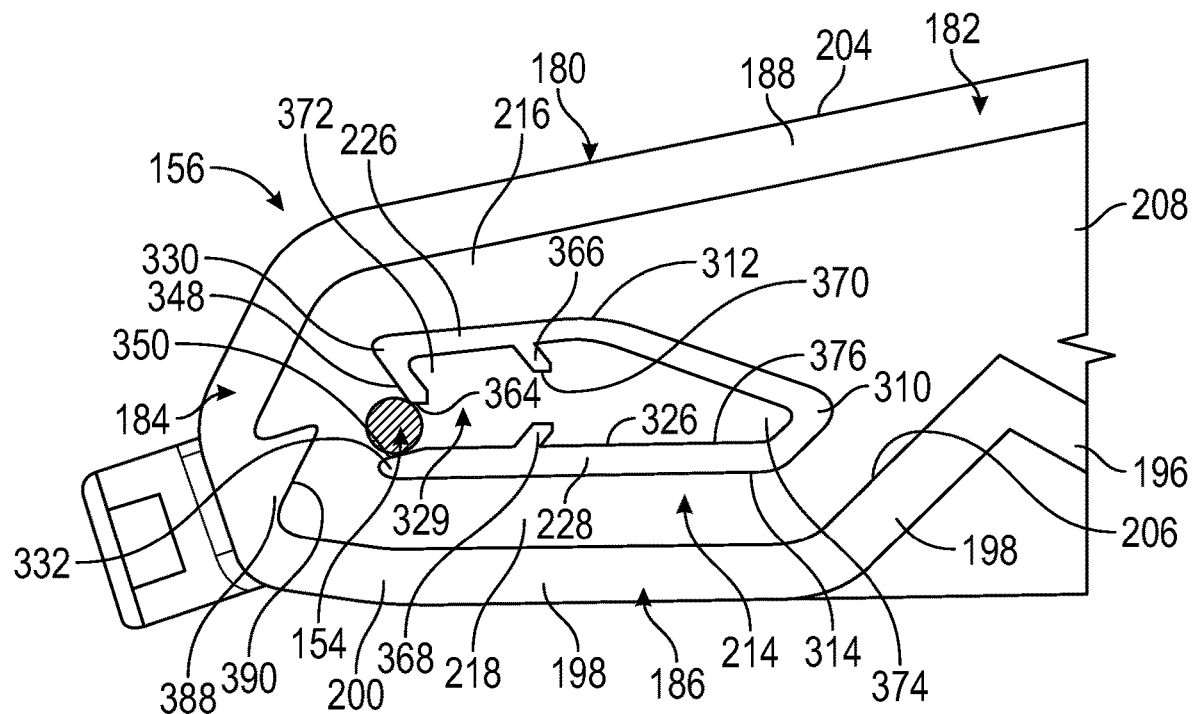
FIG. 6B is a schematic view of the second latch element of the push-push latching mechanism showing the first latch element on a latch element rest of the second latch element of FIG. 5, in accordance with a non-limiting example.

In a non-limiting example, from an open position, bin 150 is pushed toward a closed position such that first latch element 154 travels along first passage 216 toward second portion 184 of wall 180. A projection 388 having an angled surface portion 390 projects toward lock-out feature 214. Projection 388 guides first latch element 154 onto latch element rest 362 as shown in FIG. 6B. At this point, bin 150 is in a closed configuration.

Figure 6C:
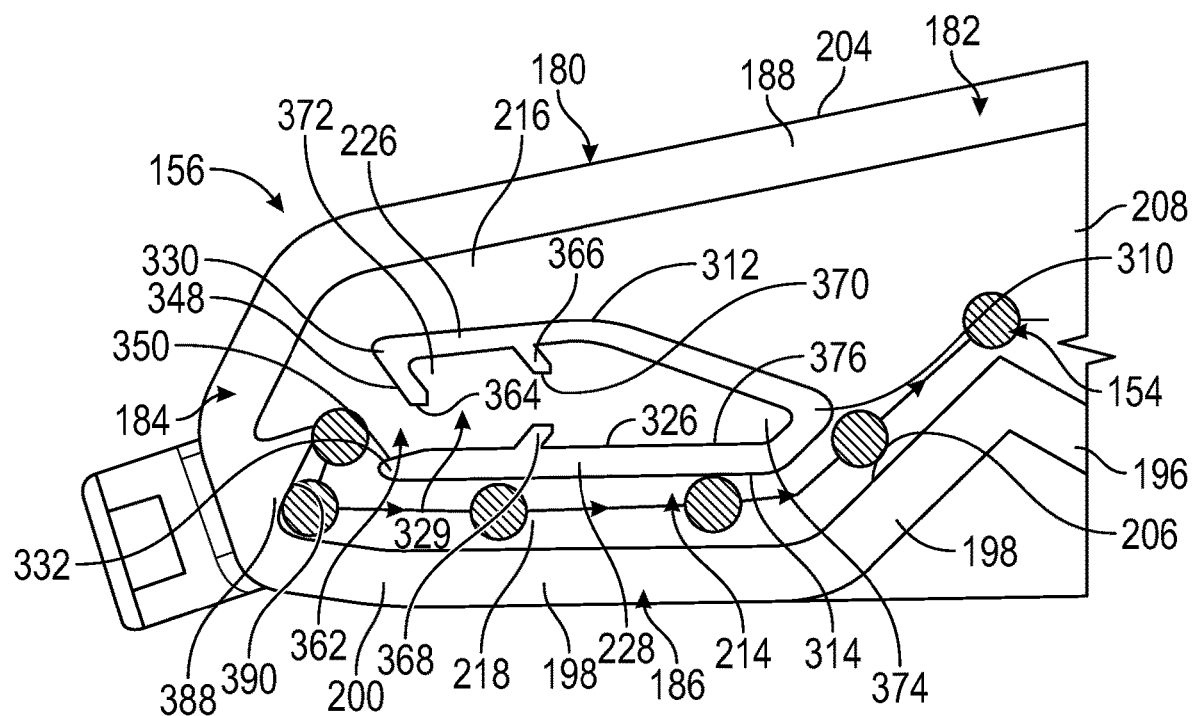
FIG. 6C is a schematic view of the second latch element of the push-push latching mechanism of FIG. 5 releasing the first latch element, in accordance with a non-limiting example.

Referring to FIG. 6C, from the closed configuration, bin 150 is again pushed causing first latch element 154 to unseat from latch element rest 332 and pass along angled surface 390 into second passage 218 as shown in FIG. 6C allowing bin 150 to open. At this point, it should be understood, that the push and the push overcomes a biasing force provided by compressive bumpers (not shown) that holds first latch element 154 against latch element rest 332. At this point it should also be understood that bin 150 may transition from a closed configuration to an open configuration, and back to the closed configuration based on the application of multiple pushes (hence the push-push designation).

Figure 6D:
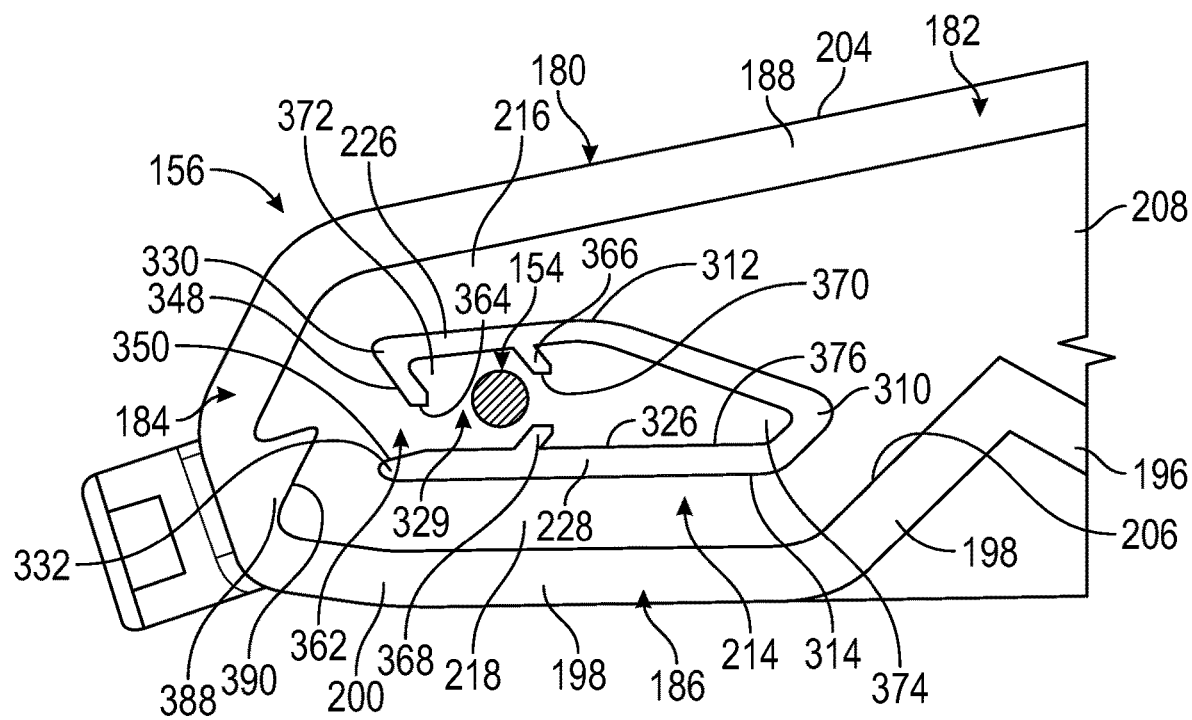
FIG. 6D is a schematic view of the second latch element of the push-push latching mechanism of FIG. 5 trapping the first latch element after an impact load, in accordance with a non-limiting example.

In accordance with a non-limiting example, bin 150 should remain closed if subjected to a sudden impact load over a selected force threshold. As such, if bin 150 is subjected to such an impact, first latch element 154 is forced or driven through first opening 364 into first trap portion 372 of latch element trap 329 as shown in FIG. 6D or, if the applied force is high enough, through second opening 370 into second trap portion 374. Upon first latch element 154 entering into latch element trap 329, bin 150 is held in a closed position such that any contents contained therein are retained and cannot fly about passenger compartment 20. Bin 150 may be reopened by applying a quick pull force that forces first latch element 154 back through first opening 364 or second opening 370 and first opening 364 to latch element rest 362.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical, and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A storage compartment for a vehicle comprising:
   a first surface fixedly mounted relative to the vehicle;
   a second surface moveably mounted relative to the first surface; and
   a latching mechanism including a first latch element mounted to one of the first surface and the second surface and a second latch element mounted to another of the first surface and the second surface,
   wherein the second latch element comprises an outer structure and an inner structure,
   wherein, at least within a plane, an entire periphery of the inner structure is spaced from the outer structure,
   wherein a first passage and a second passage are formed between the outer structure and the inner structure,
   wherein the inner structure comprises an impact load lockout feature including a latch element rest arranged between the first passage and the second passage,
   wherein the outer structure defines a first end and a second end opposite the first end,
   wherein the storage compartment is opened by moving the first latch element towards the second end or moving the second end towards the first latch element, and is closed by moving the first latch element towards the first end or moving the first end towards the first latch element,
   wherein the latch element rest includes an opening and a latch element trap, and
   wherein the opening is open towards the first end and allows passage of the first latch element towards the second end into the latch element trap when the second surface is exposed to an impact load exceeding a design force.

2. The storage compartment according to claim 1, wherein the impact load lock-out feature includes a first wall forming a surface of the first passage, a second wall defining a surface portion of the second passage, and a recess forming the latch element rest defined between the first wall and the second wall.

3. The storage compartment according to claim 2,
wherein the first wall incudes a first end portion and the second wall includes a second end portion,
wherein a first angled surface extends from the first wall towards the second wall, and a second angled surface extends from the second wall towards the first wall, and
wherein the first angled surface and the second angled surface define the latch element rest.

4. The storage compartment according to claim 3, wherein the opening is defined between the first angled surface and the second angled surface.

5. The storage compartment according to claim 3, wherein the first angled surface is spaced from the first end portion, and the second angled surface is formed in the second end portion.

6. The storage compartment according to claim 2, further comprising a guide element connecting the first wall and the second wall, the guide element separating the first passage and the second passage.

7. The storage compartment according to claim 6, further comprising:
a first throat member extending from the first wall spaced from the first angled surface and a second throat member extending from the second wall opposite the first throat member,
wherein the latch element rest is a first latch element rest, and
wherein the first throat member and the second throat member define a second latch element rest.

8. The storage compartment according to claim 7, wherein the latch element trap is defined between the first latch element rest and the second latch element rest.

9. The storage compartment according to claim 8, further comprising another latch element trap defined between the second latch element rest and the guide element.

10. The storage compartment according to claim 1, wherein the first latch element comprises a pin mounted to one of the first surface and the second surface.

11. A vehicle comprising:
a body defining a passenger compartment;
a storage compartment arranged in the passenger compartment, the storage compartment including a first surface fixedly mounted relative to the body and a second surface pivotally connected to the storage compartment relative to the first surface; and
a latching mechanism including a first latch element mounted to one of the first surface and the second surface and a second latch element mounted to another of the first surface and the second surface,
wherein the second latch element comprises an outer structure and an inner structure,
wherein, at least within a plane, an entire periphery of the inner structure is spaced from the outer structure,
wherein a first passage and a second passage are formed between the outer structure and the inner structure,
wherein the inner structure comprises an impact load lockout feature including a latch element rest arranged between the first passage and the second passage,
wherein the storage compartment is opened by moving the first latch element towards the second end or moving the second end towards the first latch element, and is closed by moving the first latch element towards the first end or moving the first end towards the first latch element,
wherein the latch element rest includes an opening and a latch element trap, and
wherein the opening is open towards the first end and allows passage of the first latch element towards the second end into the latch element trap when the second surface is exposed to an impact load exceeding a design force.

12. The vehicle according to claim 11, wherein the impact load lock-out feature includes a first wall forming a surface of the first passage, a second wall defining a surface portion of the second passage, and a recess forming the latch element rest defined between the first wall and the second wall.

13. The vehicle according to claim 12,
wherein the first wall incudes a first end portion and the second wall includes a second end portion,
wherein a first angled surface extends from the first wall towards the second wall, and
wherein a second angled surface extends from the second wall towards the first wall, the first angled surface and the second angled surface defining the latch element rest.

14. The vehicle according to claim 13, wherein the opening is defined between the first angled surface and the second angled surface.

15. The vehicle according to claim 13, wherein the first angled surface is spaced from the first end portion, and the second angled surface is formed in the second end portion.

16. The vehicle according to claim 12, further comprising a guide element connecting the first wall and the second wall, the guide element separating the first passage and the second passage.

17. The vehicle according to claim 16, further comprising:
a first throat member extending from the first wall spaced from the first angled surface and a second throat member extending from the second wall opposite the first throat member,
wherein the latch element rest is a first latch element rest, and
wherein the first throat member and the second throat member define a second latch element rest.

18. The vehicle according to claim 17, wherein the latch element trap is defined between the first latch element rest and the second latch element rest.

19. The vehicle according to claim 18, further comprising another latch element trap defined between the second latch element rest and the guide element.

20. The vehicle according to claim 11, wherein the first latch element comprises a pin mounted to the one of the first surface and the second surface on which the first latch element is mounted.

* * * * *